United States Patent
Kurapaty et al.

(10) Patent No.: US 10,368,030 B1
(45) Date of Patent: Jul. 30, 2019

(54) OPTIMIZED HISTOGRAM COMPUTATION FOR ADAPTIVE BACK LIGHT ALGORITHM DURING CAMERA PREVIEW AND VIDEO PLAYBACK

(71) Applicant: QUALCOMM Incorporated, San Diego, CA (US)

(72) Inventors: Rajeshwar Kurapaty, Hyderabad (IN); Venkata Nagarjuna Sravan Kumar Deepala, Hyderabad (IN); Srinu Gorle, Visakhapatnam (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/052,167

(22) Filed: Aug. 1, 2018

(51) Int. Cl.
  *H04N 9/80* (2006.01)
  *H04N 5/92* (2006.01)
  *H04N 5/775* (2006.01)
  *H04N 5/77* (2006.01)

(52) U.S. Cl.
  CPC ............. *H04N 5/9201* (2013.01); *H04N 5/77* (2013.01); *H04N 5/775* (2013.01)

(58) Field of Classification Search
  CPC ........ H04N 5/9201; H04N 5/775; H04N 5/77; H04N 21/44008; H04N 19/85; G06T 5/40; G06T 5/009; G06T 2207/10016
  USPC ........ 386/248, 224, 239, 230, 219, 326, 328
  See application file for complete search history.

(56) References Cited

U.S. PATENT DOCUMENTS

| | | | | |
|---|---|---|---|---|
| 2007/0164944 | A1* | 7/2007 | Meados | G09G 5/391 345/84 |
| 2014/0375691 | A1* | 12/2014 | Kasahara | G06T 11/60 345/633 |

* cited by examiner

*Primary Examiner* — Robert Chevalier
(74) *Attorney, Agent, or Firm* — Holland & Hart LLP

(57) ABSTRACT

Methods, systems, and devices for image processing are described. Generally, the described techniques provide for capturing, at a sensor of a device, an image frame including frame composition data, generating histogram metadata for the image frame, encoding the histogram metadata as supplemental enhancement information (SEI) for the image frame, receiving, at a display post-processing module of the device, the image frame and the histogram metadata, computing, by the display post-processing module of the device, a target display setting for the image frame based at least in part on the histogram metadata; and outputting the image frame to a display based at least in part on the computed display setting.

20 Claims, 9 Drawing Sheets

OPTIMIZED HISTOGRAM COMPUTATION FOR ADAPTIVE BACK LIGHT ALGORITHM DURING CAMERA PREVIEW AND VIDEO PLAYBACK

BACKGROUND

The following relates generally to image processing, and more specifically to histogram computation for adaptive backlight algorithm.

A device that captures an image may adjust display settings, such as brightness, pixel tone mapping setting, or backlighting, when outputting the captured image. For example, content adaptive backlight and brightness adjustments or pixel tone mapping adjustments may be applied to captured image data to improve an output image. In some cases, a display post-processing module may use a histogram, which may be read from a display hardware pipeline, and may read the histogram from the display hardware pipeline while the composed output frame is rendered to the panel of the device. The display post-processing module or modules may use the information from the histogram to compute and adjust backlighting, brightness settings, or pixel tone mapping setting. However, reading the histogram from the display hardware pipeline while the composed output frame is rendered to the panel may result in a delay of one, two, or more frames between capturing the image (and calculating the related histogram data) and application of the histogram data to improve the display settings.

SUMMARY

The described techniques relate to improved methods, systems, devices, and apparatuses that support histogram computation for adaptive backlight algorithm. Generally, the described techniques provide for capturing, at a sensor of a device, an image frame including frame composition data, generating histogram metadata for the image frame, encoding the histogram metadata as supplemental enhancement information (SEI) for the image frame, receiving, at a display post-processing module of the device, the image frame and the histogram metadata, computing, by the display post-processing module of the device, a target display setting for the image frame based at least in part on the histogram metadata; and outputting the image frame to a display based at least in part on the computed display setting.

A method of image processing at a device is described. The method may include capturing, at a sensor of the device, an image frame including frame composition data, generating histogram metadata for the image frame, encoding the histogram metadata as SEI for the image frame, receiving, at a display post-processing module of the device, the image frame and the histogram metadata, computing, by the display post-processing module of the device, a target display setting for the image frame based on the histogram metadata, and outputting the image frame to a display based on the computed display setting.

An apparatus for image processing at a device is described. The apparatus may include a processor, memory in electronic communication with the processor, and instructions stored in the memory. The instructions may be executable by the processor to cause the apparatus to capture, at a sensor of the device, an image frame including frame composition data, generate histogram metadata for the image frame, encode the histogram metadata as SEI for the image frame, receive, at a display post-processing module of the device, the image frame and the histogram metadata, compute, by the display post-processing module of the device, a target display setting for the image frame based on the histogram metadata, and output the image frame to a display based on the computed display setting.

Another apparatus for image processing at a device is described. The apparatus may include means for capturing, at a sensor of the device, an image frame including frame composition data, generating histogram metadata for the image frame, encoding the histogram metadata as SEI for the image frame, receiving, at a display post-processing module of the device, the image frame and the histogram metadata, computing, by the display post-processing module of the device, a target display setting for the image frame based on the histogram metadata, and outputting the image frame to a display based on the computed display setting.

A non-transitory computer-readable medium storing code for image processing at a device is described. The code may include instructions executable by a processor to capture, at a sensor of the device, an image frame including frame composition data, generate histogram metadata for the image frame, encode the histogram metadata as SEI for the image frame, receive, at a display post-processing module of the device, the image frame and the histogram metadata, compute, by the display post-processing module of the device, a target display setting for the image frame based on the histogram metadata, and output the image frame to a display based on the computed display setting.

In some examples of the method, apparatuses, and non-transitory computer-readable medium described herein, receiving the image frame and the histogram metadata further may include operations, features, means, or instructions for receiving a buffer handle indicating a buffer including a preview path for the image frame, the buffer handle including the histogram metadata.

In some examples of the method, apparatuses, and non-transitory computer-readable medium described herein, receiving the image frame and the histogram metadata further may include operations, features, means, or instructions for receiving a camera preview video buffer or a recording buffer, the camera preview video buffer or the recording buffer including the histogram metadata.

In some examples of the method, apparatuses, and non-transitory computer-readable medium described herein, encoding the histogram metadata as SEI further may include operations, features, means, or instructions for embedding the histogram metadata in a user data SEI network abstraction layer (NAL) of an encoded bit stream for a camera video record mode.

Some examples of the method, apparatuses, and non-transitory computer-readable medium described herein may further include operations, features, means, or instructions for playing media from the encoded bit stream; where receiving the image frame and the histogram metadata further includes extracting, by a video decoder, the histogram metadata from the user data SEI NAL of the encoded bit stream.

In some examples of the method, apparatuses, and non-transitory computer-readable medium described herein, a backlight setting, a pixel tone mapping setting, or a brightness setting.

In some examples of the method, apparatuses, and non-transitory computer-readable medium described herein, the image frame may be one of a set of consecutive frames in a camera preview during a camcorder recording.

In some examples of the method, apparatuses, and non-transitory computer-readable medium described herein, the image frame may be one of a set of consecutive frames in a video playback of a recorded clip.

DETAILED DESCRIPTION

A device, when capturing an image, may adjust display settings such as brightness, pixel tone mapping setting, or backlighting when outputting a captured image. For example, a content adaptive backlight and brightness adjustment algorithm or a pixel tone mapping algorithm may be applied to captured image data to improve an output image. In some cases, a display post-processing module may use a histogram, which may be read from a display hardware pipeline, and may read the histogram from the display hardware pipeline while the composed output frame is rendered to the panel of the device. The display post-processing module or modules may use the information from the histogram to compute a target display setting (e.g., backlighting, brightness settings, or pixel tone mapping setting). However, reading the histogram from the display hardware pipeline while the composed output frame is rendered to the panel may result in a delay of one, two, or more frames between capturing the image (and calculating the related histogram data) and application of the histogram data to improve the display settings.

In some examples, a device may decrease or remove such delays by computing histogram data one time at the source of the captured image. In some examples, a device may display the captured image as part of a camera preview. In such examples, the device may generate histogram data, or may convert generated histogram data to histogram metadata, which it can use to update display settings for the captured image frame to which the histogram data corresponds. Histogram data may be calculated one time at the source of the captured image, and may be transmitted, in the form of metadata, to the display post processing module so that display settings can be adjusted based on current histogram data. For instance, the device may receive the histogram metadata from the camera pipeline and may determine target display settings based on the histogram metadata. In some examples, the device may display a captured image as part of a recorded video playback procedure. In such examples, the device may encode the histogram metadata in a compressed bit stream along with image frame data, may decode the histogram metadata and supply it from the video decode pipeline to a display post processing module. The supplied histogram metadata may be used to set target display settings for video playback of the captured image frame.

Aspects of the disclosure are illustrated by and described with reference to apparatus diagrams, system diagrams, and flowcharts that relate to histogram computation for adaptive backlight algorithm.

Figure 1:
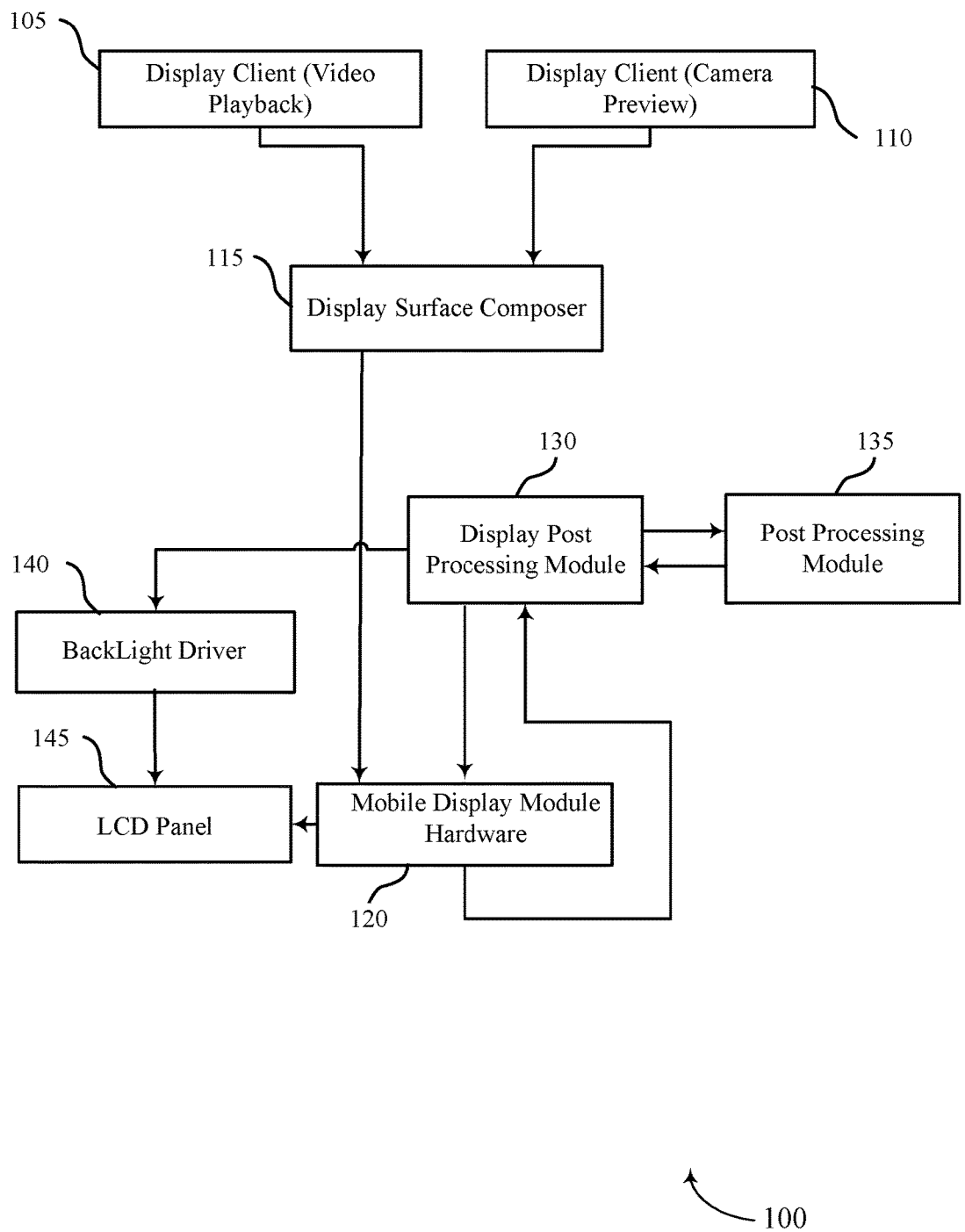
FIG. 1 illustrates an example of an image processing pipeline for a device that supports histogram computation for adaptive backlight algorithm in accordance with aspects of the present disclosure.

FIG. 1 illustrates an example of an image processing pipeline 100 that supports histogram computation for adaptive backlight algorithm in accordance with aspects of the present disclosure. In some cases, a device such as a cell phone, a laptop computer, a desktop computer, or the like, may include a camera which can capture an image.

A device, may capture an image, and may adjust display settings such as brightness, pixel tone mapping settings, or backlighting when outputting the captured image. For example, a content adaptive backlight and brightness adjustment algorithm or a pixel tone mapping algorithm may be applied to image data and current display settings of a captured image to improve an output image. In some examples, a device may generate a histogram comprising image data. For example, histogram data corresponding to a captured image may include brightness, saturation, backlighting, or other display setting data. Histogram data may be utilized by a device to set or adjust display settings for displaying subsequent image frames. In some cases, a display post-processing module may read histogram data from a display hardware pipeline while the composed output frame is rendered to the panel of the device for display. The display post-processing module or other hardware or software modules may use the information from the histogram to compute and adjust display settings. Such computed settings or adjustments may be applied to achieve power savings in the device, and may also improve the output image (e.g., may be used to set contrast and enhancement features of the output image).

For example, a display client device 105 performing video playback, or a display client device 110 performing a camera preview, may capture or receive from a sensor, an image frame. Either of display client device 105 or display client device 110 may send the captured image frame to one or more modules or submodules of an image processing pipeline (e.g., display surface composer 115). Modules or submodules of the image processing pipeline may referred to as modules, engines, managers, systems, or subsystems. Aspects of the modules or submodules of the image processing pipeline may be implemented entirely in hardware, such as in application-specific integrated circuits or field programmable gate arrays (FPGAs) programmed to implement the algorithms described herein. Additionally, or alternatively, aspects of the modules or submodules of the image processing pipeline may be implemented as special-purpose software or firmware executed by a special-purpose processor, such as a graphics processing unit (GPU), or a general-purpose processor or controller, such as a central processing unit (CPU). If implemented as software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Display surface composer 115 may compose the image for display and send image data to display hardware modules or systems, such as mobile display module hardware 120. Mobile display module hardware 120 may include one or more submodules. Mobile display module hardware 120 or a submodule of mobile display module hardware 120 may calculate, receive from the display surface composer 115, or otherwise obtain histogram data representing current display settings (e.g., backlighting, pixel tone mapping settings, or brightness information), and may provide the histogram data to display post processing module 130. However, the histogram data corresponding to the current image frame (e.g., the image frame currently being displayed) may be utilized by the device to adjust display settings for a subsequent image frame.

For instance, while or after a current image frame is communicated to and displayed via LCD panel 145, display post processing module 130 may be in communication with post processing module 135. Post processing module 135 may include and apply one or more algorithms or calculations to generate display setting updates (e.g., brightness values, pixel tone mapping settings, and backlighting updates) for a current histogram based on the current histogram data. The display setting updates may be programmed for application at mobile display module hardware 120 and backlight driver 140.

In some examples, Display post processing module 130 may program a lookup table (LUT) (e.g., brightness settings) to mobile display hardware module 125 (for histogram post-processing) and may program backlight values to backlight driver 140. In such examples, backlight values from backlight driver 140 and brightness settings or pixel tone mapping settings in the form of a LUT from mobile display hardware module 125 may be applied to LCD panel 145. In some examples, histogram data provided to display post processing module 130 may be based on a current image frame, as discussed above. However, the brightness values and LUT data provided to LCD panel 145 may be applied to a subsequent image frame. Thus, an image frame may be captured and displayed, but display settings updates based on histogram data that corresponds to the captured image frame may not be applied at LCD panel 145 (and therefore brightness and backlight adjustments and updates may not be implemented) for a delay of one, two, or more frames.

Resolution for images captured by devices such as the device described above may be set to provide, for example, high definition (HD) images (e.g., resolution of 1280×720 pixels), or full high definition (FHD) images (e.g., resolution of 1920×1080 pixels), or ultra-high definition (UHD) (e.g., resolution of 3840×2160 pixels), or even a 5.7K, 6K, or 8K resolution. A device that is capable of capturing images at such high resolutions may capture an image frame and calculate and apply brightness and backlighting adjustments to a subsequent image frame. However, such repetitive computations of histogram data by display post-processing module 130 may result in overloading a central processing unit (CPU) or display process that is configured to perform post-processing functionality.

Histogram data may be available at the source of an image frame (e.g., an incoming camera preview buffer or a video playback rendering buffer). In such examples, a device may compute and utilize the histogram data computed at the source of the image frame, and avoid redundant delays in histogram processing and pixel adjustments, as described in greater detail with respect to FIGS. 2-4.

Figure 2:
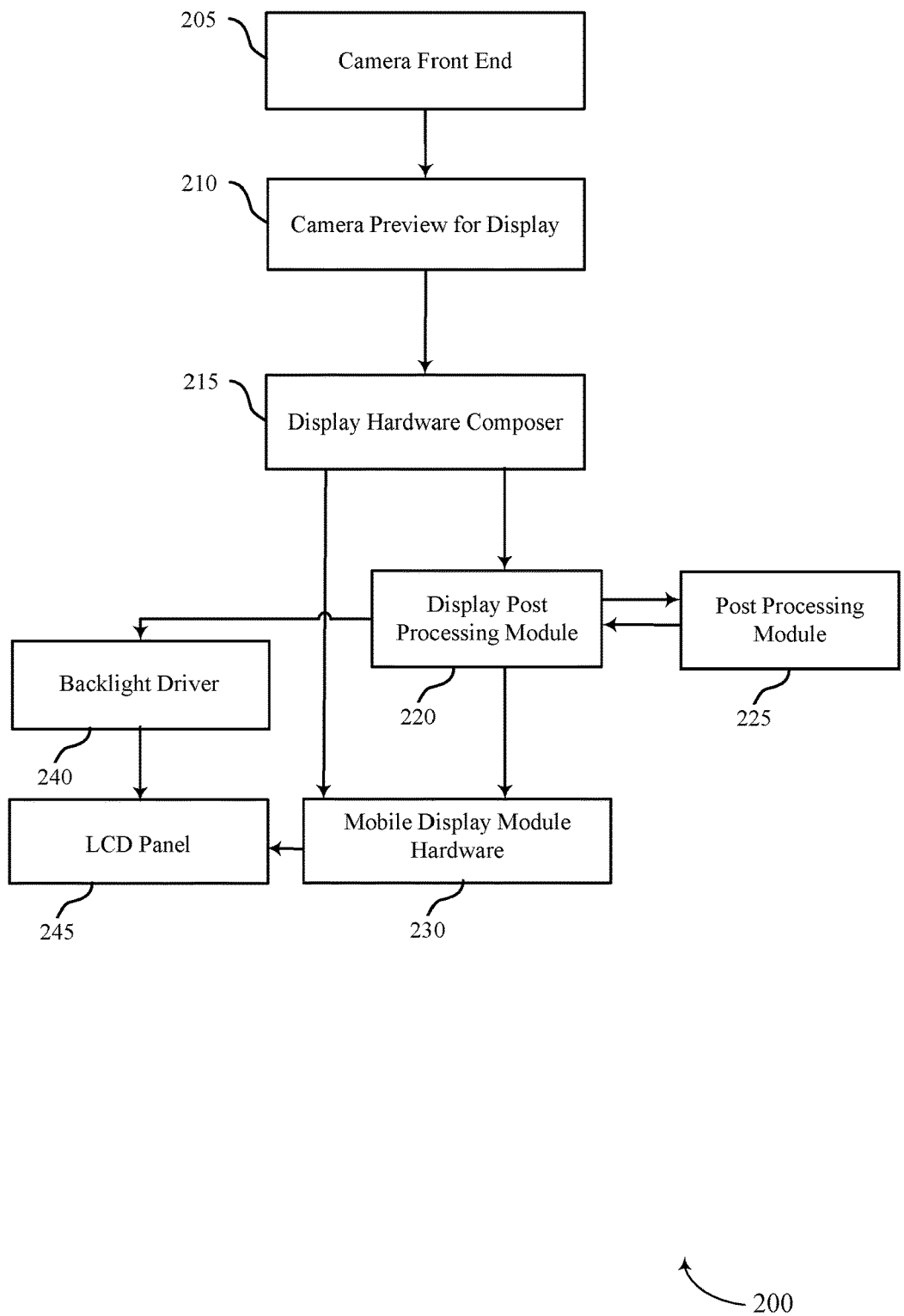
FIG. 2 illustrates an example of an image processing pipeline for a device that supports histogram computation for adaptive backlight algorithm in accordance with aspects of the present disclosure.

FIG. 2 illustrates an example of an image processing pipeline 200 that supports histogram computation for adaptive backlight algorithm in accordance with aspects of the present disclosure. In some examples, image processing pipeline 200 may illustrate examples of histogram computation and utilization for a device capturing an image frame and providing the image frame to a camera preview path. The image processing pipeline 200 may include one or more modules, engines, managers, systems, or subsystems. Modules of the image processing pipeline may be implemented in hardware, software executed by a processor, firmware, or any combination thereof. In some examples, modules of the image processing pipeline may be implemented in specialized hardware for the purpose of executing processes of the image processing pipeline, or may be implemented in generic hardware in combination with specialized software. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

In some examples, histogram data may be computed one time at the source of image frame data. A device may compute histogram data at the sensor that captures the image frame, at one or more hardware modules of the device, or may be computed via software. One or more modules of a device may supply the computed histogram data as metadata to a mobile display post-processing module.

In some examples, a device may utilize a camera preview, which may be displayed during recording. For example, a mobile device capturing a recording may provide a camera preview on a display panel (e.g., LCD panel 245), or a camcorder capturing a video may provide a camera preview on a display panel (e.g., camera preview for display 210 or LCD panel 245).

In some examples, an image frame may be captured by one or more sensors of a device, and may be provided to camera front end 205 (e.g., video processing engine (VPE) or image processing engine (IPE). Camera front end 205 may provide image frame data (e.g., image composition information) and histogram metadata (which may be generated by one or more hardware modules of the device) to a camera preview for display 210. Camera preview for display 210 may provide the frame data and the histogram metadata to display hardware composer 215.

In some examples, histogram metadata corresponding to a captured image frame may be computed in an existing hardware block (such as camera front end 205) or may be implemented and included in the processing pipeline via one or more new hardware blocks. In some cases, histogram data may be converted to histogram metadata, and included in a buffer or a buffer handle. For example, a buffer handle may indicate a buffer in which histogram metadata is embedded. In some examples, the histogram metadata may be included in the buffer handle. A buffer handle for a mobile display module hardware 230 may indicate a buffer for a camera preview for display path, and the buffer (e.g., the camera preview buffer) may include the histogram metadata. In other examples, the histogram metadata may be included in the video buffer In some examples, display hardware composer 215 may provide the frame data directly to mobile display module hardware 230, which may include one or more submodules. Display module hardware 230 may perform frame data processing, histogram data processing, or post-processing procedures. In some examples, display hardware composer 215 may convert the histogram metadata into metadata or may receive histogram metadata from another module (e.g., display hardware composer 215) in a video buffer. Display hardware composer 215 may provide the histogram metadata to display post processing module 220.

Display post processing module 220 may be in communication with post processing module 225. Post processing module 225 may, for example, update display settings based on the histogram metadata of the current image frame. Upon determining the updated display settings, display post processing module 220 may provide LUT data (e.g., brightness values) to mobile display module hardware 230, and may provide backlighting data to backlight driver 240. Both LUT values and backlighting data may correspond to a current image frame. The image frame may then be provided to LCD panel 245, which may display the current image frame based on the frame data provided by mobile display module hardware 230, the LUT data provided by mobile display module hardware 230, and the backlighting data provided by backlight driver 240. LCD panel 245 may be a display panel of the same device that captured the image. In some examples, the image capturing device may transmit the image data and the updated display settings to a separate display. For example, LCD panel 245 may be a display on a separate device from the image capturing device, and the image data and the display settings (or in some cases, the image data and the updated display settings) may be transmitted via a wired connection or a wireless connection (e.g., Wi Fi) to the display on the separate device.

Figure 3:
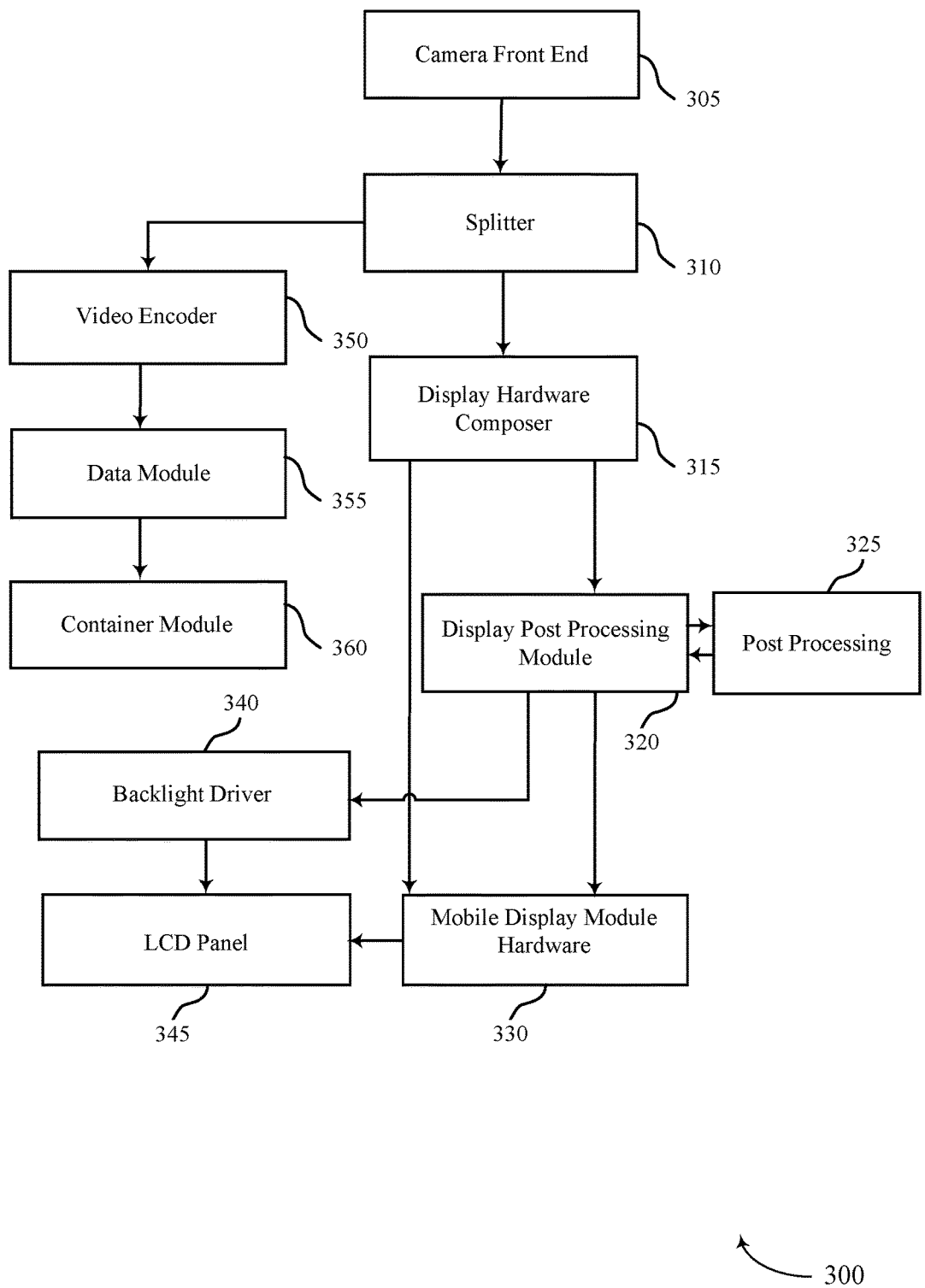
FIG. 3 illustrates an example of an image processing pipeline for a device that supports histogram computation for adaptive backlight algorithm in accordance with aspects of the present disclosure.

In some examples, a module such as a video encoder may encode the histogram meta data as a user data (Supplemental Enhancement Information) SEI, as shown in greater detail with respect to FIG. 3.

FIG. 3 illustrates an example of an image processing pipeline 300 that supports histogram computation for adaptive backlight algorithm in accordance with aspects of the present disclosure. In some examples, image processing pipeline 300 may implement aspects of image processing pipeline 100 or image processing pipeline 200. In some examples, a device may calculate histogram metadata at the source of a captured image frame, may use the histogram metadata to set display settings in a camera preview, may play back recorded video including the captured image frame, and may calculate target display settings for the captured image frame based on the histogram metadata.

In some examples, histogram metadata may be computed one time at the source of image frame data. One or more modules of a device may supply the histogram metadata as metadata to a mobile display post-processing module.

In some examples, a device may utilize a camera preview and a recording process. The device may further engage a video encoder to format histogram metadata for use in backlighting and brightness setting updates with a frame delay of zero.

In some examples, an image frame may be captured by one or more sensors of a device, and may be provided to camera front end (VPE/IPE) 305. Camera front end 305 may provide frame data (e.g., image composition information) and histogram metadata (which may be generated by one or more hardware modules of the device) to a splitter 310. Splitter 310 may provide frame data and histogram metadata to video encoder 350. In some examples, video encoder 350 may encode the histogram metadata as user data SEI network abstraction layer (NAL). For instance, in the case of some standards for image capture and resolution (e.g., H264/H265), each image frame and a compressed bit stream may be put into a container format. That is, a data module 355 may generate or adjust a compressed bit stream to include image data for a first image frame and a user data SEI including the encoded histogram metadata. Data module 355 may send the compressed data stream to container module 360. Container module 360 may format the information received from data module 355 and may generate a file format (e.g., 3GPP multimedia or MPEG-4 (mp4). In some examples, the information in the container format of container module 360 may provide the compressed bit stream and encoded data to a video decoder, as shown in greater detail with respect to FIG. 4. For instance, histogram metadata in the form of compressed bit streams may be provided to a video decoder for video playback, and histogram metadata that is not encoded in the form of compressed bit streams may be provided via splitter 310 for a camera preview. In some examples, a device may send histogram metadata to the video encoder 350 and the display hardware composer 315 via splitter 310, may send histogram metadata only to video encoder 350, or may send histogram metadata only to display hardware composer 315. In some examples, histogram metadata may be send to display hardware composer 315 and on to display post processing module 320, and brightness adjustments and LUT values may be provided to LCD panel 345 for a camera preview based on the histogram metadata. In such examples, histogram metadata may be encoded by video encoder 350 and decoded by video decoder 414 as described in greater detail with respect to FIG. 4.

In some examples, histogram metadata corresponding to a captured image frame may be computed in an existing hardware block (such as camera front end 305) or may implement and include in the processing pipeline one or more new hardware blocks. In some cases, histogram metadata may be converted to histogram metadata, and included in a buffer. For example, a buffer handle may indicate a buffer in which histogram metadata is embedded. Or, a buffer handle indicating a buffer may include the histogram metadata. A buffer handle for a mobile display module hardware 330 may indicate a buffer for a camera preview display path, and the buffer may include the histogram metadata.

In some examples, display hardware composer 315 may provide the image frame data directly to mobile display module hardware 330, which may include one or more submodules. Display module hardware 330 may perform frame data processing, histogram data processing, or post-processing procedures. In some examples, display hardware composer 315 may receive histogram metadata from another module (e.g., display hardware composer 215) in a video buffer, as shown with respect to FIG. 2. In such examples, display hardware composer 215 may provide the histogram metadata to display post processing module 220.

Display post processing module 320 may be in communication with post processing module 325. Post processing module 325 may, for example, update or set display settings based on the histogram metadata of the current image frame. Upon determining the display setting updates, display post processing module may provide LUT data (e.g., brightness values) to mobile display module hardware 330, and may provide backlighting data to backlight driver 340. Both of LUT data and backlighting values may correspond to a current image frame. The image frame may then be provided to LCD panel 345, which may display the current image frame of the camera preview based on the frame data provided by mobile display module hardware 330, the LUT data provided by mobile display module hardware 330, and the backlighting data provided by backlight driver 340. In some examples, the image capturing device may transmit the image data and the updated display settings to a separate display. For example, LCD panel 345 may be a display on a separate device from the image capturing device, and the image data and the display settings (or in some cases, the image data and the updated display settings) may be transmitted via a wired connection or a wireless connection (e.g., Wi Fi) to the display on the separate device. In some examples, the device may determine target display settings for a camera preview based on histogram metadata received directly from the camera display pipeline, as described above. In some cases, the same device may determine target display settings for video playback of recorded video based on encoded histogram metadata, which may be decoded and supplied to an LCD panel 345 for video playback, as described with respect to FIG. 4.

Figure 4:
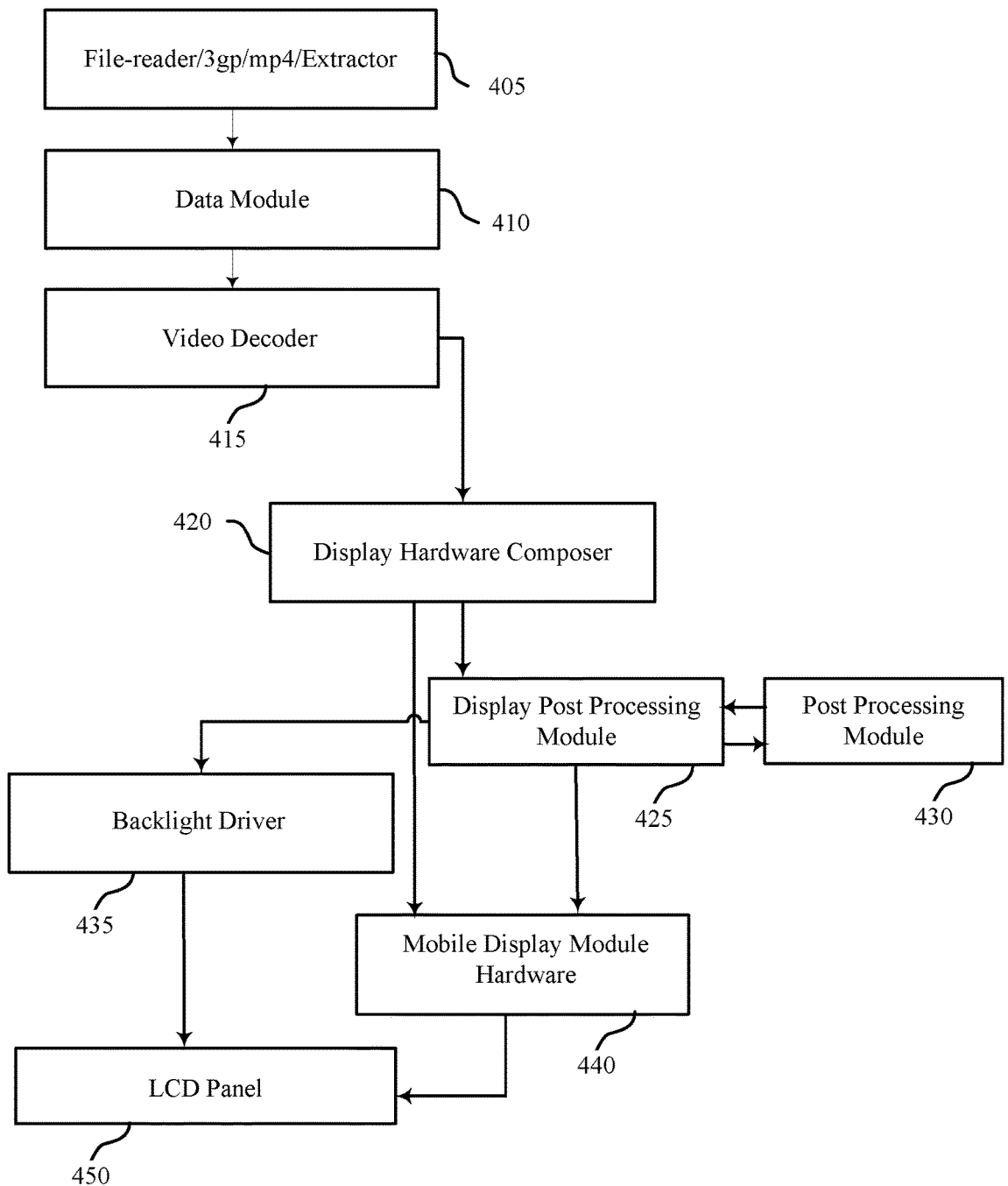
FIG. 4 illustrates an example of image processing pipeline for a device that supports histogram computation for adaptive backlight algorithm in accordance with aspects of the present disclosure.

FIG. 4 illustrates an example of an image processing pipeline 400 that supports histogram computation for adaptive backlight algorithm in accordance with aspects of the present disclosure. In some examples, image processing pipeline 400 may implement aspects of image processing pipeline 100, 200, or 300. In some examples, a device may calculate histogram metadata at the source of a captured image frame, play back recorded video including the captured image frame, and may calculate target display settings for the captured image frame based on the histogram metadata. The image processing pipeline 400 may include one or more modules, engines, managers, systems, or subsystems. Modules of the image processing pipeline may be implemented in hardware, software executed by a processor, firmware, or any combination thereof. In some examples, modules of the image processing pipeline may be implemented in specialized hardware for the purpose of executing processes of the image processing pipeline, or may be implemented in generic hardware in combination with specialized software. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

In some examples, a device may receive encoded data in a container format (e.g., 3gp, mp4, or the like). The encoded data may be embedded in an SEI NAL as described in greater detail with respect to FIG. 3. In such examples, the device may extract, via extractor 405, the data. The data may be sorted or processed at data module 410. The histogram metadata may be in the form of a user data SEI NAL of an encoded bit stream of captured video that is currently being played back. The metadata may be associated with a video buffer. In some examples, the video buffer associated with the extracted metadata may correspond to the same video buffer that is sent to display for rendering. In such examples, display post processing module 425 may use the histogram metadata associated with the video buffer of the video recording being played back for display setting adjustments of the image frame being played as part of the video playback. In such cases, the device would not operate on the buffer a second time. That is, the device may extract, decode, and process the histogram metadata corresponding to the buffer, and apply it directly to the output image as described below, without operating on the buffer a first time and a second time with a multi frame delay (as shown in FIG. 1).

For example, Data module 410 may identify, sort, or otherwise process one or more compressed bit streams containing, for example, a first user data SEI including histogram metadata to a first image frame included in the compressed bit stream. The compressed bit stream may include multiple consecutive image frames (e.g., a first image frame, a second image frame, a third image frame, etc.) and may include histogram metadata corresponding to each of the included image frames. Video decoder 415 may provide the extracted data to display hardware composer 420. In some cases, decoded histogram metadata provided to display hardware composer 420 may correspond to video playback, and histogram metadata provided directly from a splitter as shown in FIG. 3 may correspond to a video preview. The reverse may also be true in some cases, or a device may utilize only encoded histogram metadata or may only use histogram metadata directly from a camera front end.

In the case where display hardware composer 420 receives decoded histogram metadata and decoded frame data from video decoder 415, display hardware composer 420 may provide the frame data directly to mobile display module hardware 440, which may include one or more submodules. Display module hardware 440 may perform frame data processing, histogram data processing, or post-processing procedures. In some examples, display hardware composer 420 may receive histogram metadata from another module (e.g., display hardware composer 420) in a video buffer. Display hardware composer 420 may provide the histogram metadata to display post processing module 425.

Display post processing module 425 may be in communication with post processing module 430. Post processing module 430 may, for example, update or set display settings based on the histogram metadata of the current image frame. Upon determining the display setting updates, display post processing module may provide LUT data (e.g., brightness values) to mobile display module hardware 440, and may provide backlighting data to backlight driver 435. Both of LUT values and backlighting data may correspond to a current image frame. The image frame may then be provided to LCD panel 450, which may display the current image frame of the video playback based on the frame data provided by mobile display module hardware 440, the LUT data provided by mobile display module hardware 440, and the backlighting data provided by backlight driver 435.

Figure 5:
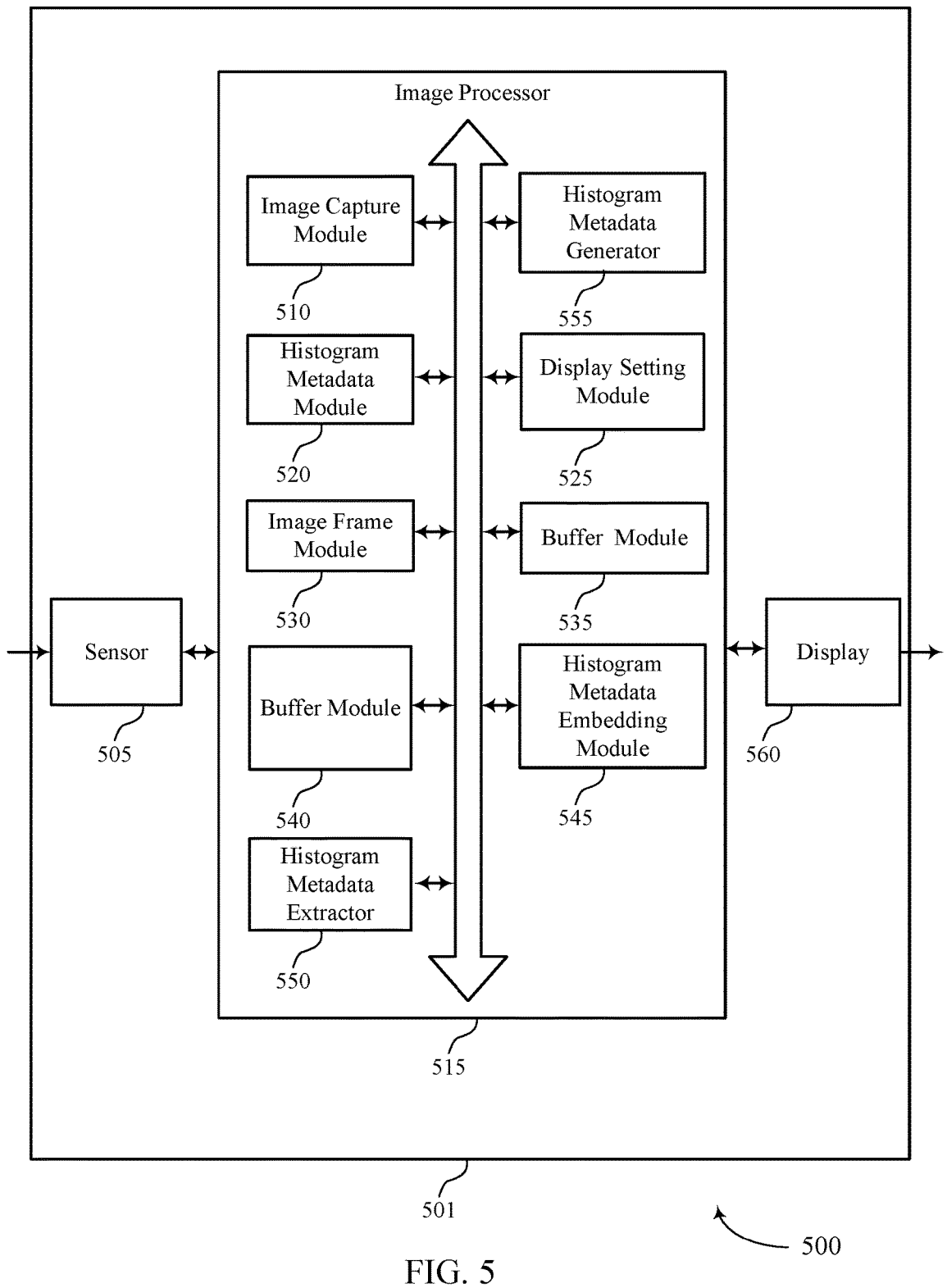
FIG. 5 shows a block diagram of a device that supports histogram computation for adaptive backlight algorithm in accordance with aspects of the present disclosure.

FIG. 5 shows a block diagram 500 of a device 501 that supports histogram computation for adaptive backlight algorithm in accordance with aspects of the present disclosure.

The device 501 may be an example of aspects of a device as described herein. The device 501 may include a sensor 505 an image processor 515, and a display 560 The device 501 may also include a processor. Each of these components may be in communication with one another (e.g., via one or more buses).

The device 501 may receive information such as packets, user data, or control information associated with various information channels (e.g., control channels, data channels, and information related to histogram computation for adaptive backlight algorithm, etc.). Information may be passed on to other components of the device 501.

Sensor 505 may capture an image frame including frame composition data. Sensor 505 may be controlled or triggered by image capture module 510. Sensor 505 may receive instructions from image processor 515, which may trigger the capture of the image frame.

The image processor 515 may capture, at a sensor 505 of the device, an image frame including frame composition data, generate histogram metadata for the image frame, receive, at a display post-processing module of the device, the image frame and the histogram metadata, encode the histogram metadata as supplemental enhancement information (SEI) for the image frame, compute, by the display post-processing module of the device, a target display setting for the image frame based on the histogram metadata, and output the image frame to a display based on the computed display setting. The image processor 515 may be an example of aspects of the image processor 610 described herein.

The image processor 515, or its sub-components, may be implemented in hardware, code (e.g., software or firmware) executed by a processor, or any combination thereof. If implemented in code executed by a processor, the functions of the image processor 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The image processor 515, or its sub-components, may be physically located at various positions, including being distributed such that portions of functions are implemented at different physical locations by one or more physical components. In some examples, the image processor 515, or its sub-components, may be a separate and distinct component in accordance with various aspects of the present disclosure. In some examples, the image processor 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The image processor 515 may include an image capture manager 510, a histogram metadata generator 555, a histogram metadata manager 520, a display setting manager 525, an image frame manager 530, a buffer manager 535, a buffer manager 540, a histogram metadata embedding manager 545, and a histogram metadata extractor 550. Each of these modules may communicate, directly or indirectly, with one another (e.g., via one or more buses).

The image capture manager 510 may trigger or oversee capture, by sensor 505 of the device, an image frame including frame composition data.

The histogram metadata generator 555 may generate histogram metadata for the image frame. In some examples, the histogram metadata generator 555 may receive, at a display post-processing module of the device, the image frame and the histogram metadata.

The histogram metadata manager 520 may encode the histogram metadata as SEI for the image frame.

The display setting manager 525 may compute, by the display post-processing module of the device, a target display setting for the image frame based on the histogram metadata. In some cases, a backlight setting, a pixel tone mapping setting, or a brightness setting.

The image frame manager 530 may output the image frame to a display based on the computed display setting. In some cases, the image frame is one of a set of consecutive frames in a camera preview during a camcorder recording. In some cases, the image frame is one of a set of consecutive frames in a video playback of a recorded clip.

The buffer manager 535 may receive a buffer handle indicating a buffer including a preview path for the image frame, the buffer handle including the histogram metadata.

The buffer manager 540 may receive a camera preview video buffer or a recording buffer, the camera preview video buffer or the recording buffer including the histogram metadata.

The histogram metadata embedding manager 545 may embed the histogram metadata in a user data SEI NAL of an encoded bit stream for a camera video record mode.

The histogram metadata extractor 550 may play media from the encoded bit stream; where receiving the image frame and the histogram metadata further includes extracting, by a video decoder, the histogram metadata from the user data SEI NAL of the encoded bit stream.

The display 560 may output the image frame to a display based on the computed display setting. The display 560 may be managed, controlled, or triggered by image frame manager 530. For example, the display 560 may be an example of aspects of the display 650 described with reference to FIG. 6.

Figure 6:
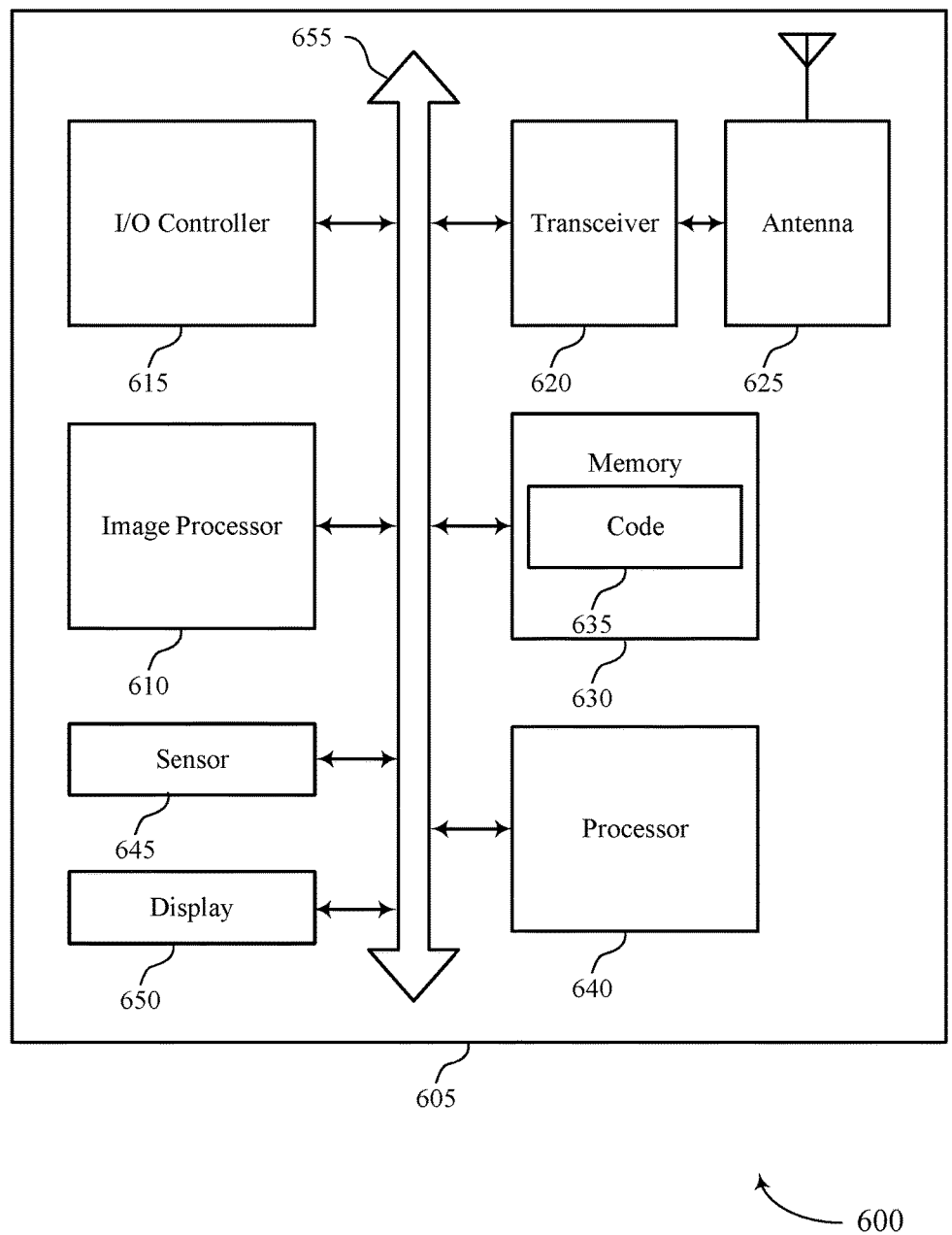
FIG. 6 shows a diagram of a system including a device that supports histogram computation for adaptive backlight algorithm in accordance with aspects of the present disclosure.

FIG. 6 shows a diagram of a system 600 including a device 605 that supports histogram computation for adaptive backlight algorithm in accordance with aspects of the present disclosure. The device 605 may be an example of or include the components of device 501, or a device as described herein. The device 605 may include components for bi-directional voice and data communications including components for transmitting and receiving communications, including an image processor 610, an I/O controller 615, a transceiver 620, an antenna 625, memory 630, and a processor 640. These components may be in electronic communication via one or more buses (e.g., bus 655).

Sensor 645 may capture an image frame including frame composition data. Sensor 645 may be controlled or triggered by image processor 610.

The image processor 610 receive an image frame, which may have been captured by sensor 645. In some examples, image processor 610 may initiate, trigger, or control capture of an image frame by sensor 645. In some examples, the captured image frame may include frame composition data. The image processor 610 may generate histogram metadata for the image frame, receive, at a display post-processing module of the device, the image frame and the histogram metadata, encode the histogram metadata as SEI for the image frame, compute, by the display post-processing module of the device, a target display setting for the image frame based on the histogram metadata, and output the image frame to a display based on the computed display setting.

The display 650 may output the image frame to a display based on the computed display setting. The display 650 may be managed, controlled, or triggered by image processor 610.

The I/O controller 615 may manage input and output signals for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The transceiver 620 may communicate bi-directionally, via one or more antennas, wired, or wireless links as described above. For example, the transceiver 620 may represent a wireless transceiver and may communicate bi-directionally with another wireless transceiver. The transceiver 620 may also include a modem to modulate the packets and provide the modulated packets to the antennas for transmission, and to demodulate packets received from the antennas.

In some cases, the wireless device may include a single antenna 625. However, in some cases the device may have more than one antenna 625, which may be capable of concurrently transmitting or receiving multiple wireless transmissions.

The memory 630 may include RAM and ROM. The memory 630 may store computer-readable, computer-executable code 635 including instructions that, when executed, cause the processor to perform various functions described herein. In some cases, the memory 630 may contain, among other things, a BIOS which may control basic hardware or software operation such as the interaction with peripheral components or devices.

The processor 640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In other cases, a memory controller may be integrated into the processor 640. The processor 640 may be configured to execute computer-readable instructions stored in a memory (e.g., the memory 630) to cause the device 605 to perform various functions (e.g., functions or tasks supporting histogram computation for adaptive backlight algorithm). In some examples, processor 640 may include, work in conjunction with, or be the same as image processor 610. Device 605 may include an image processor 610 which performs all the operations of processor 640, or a processor 640 which performs all the operations of image processor 610.

The code 635 may include instructions to implement aspects of the present disclosure, including instructions to support image processing. The code 635 may be stored in a non-transitory computer-readable medium such as system memory or other type of memory. In some cases, the code 635 may not be directly executable by the processor 640 but may cause a computer (e.g., when compiled and executed) to perform functions described herein.

Figure 7:
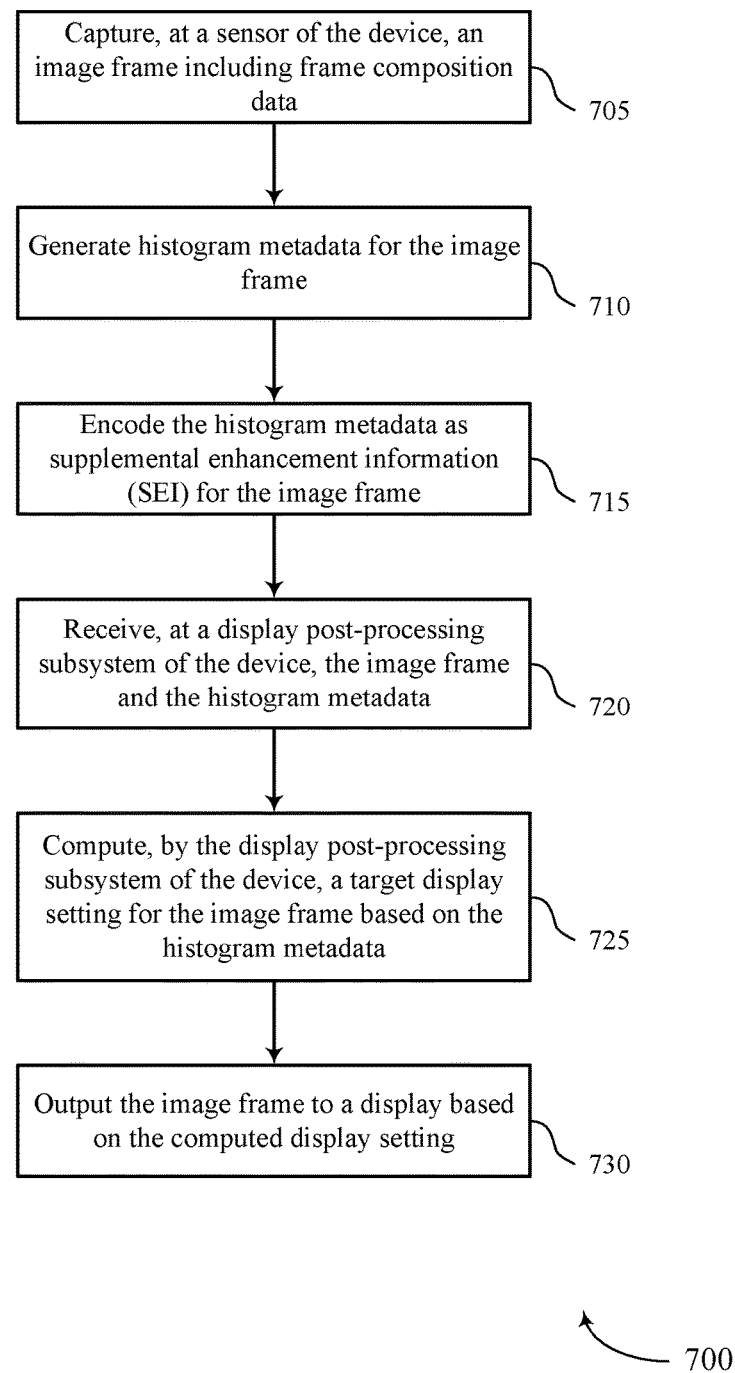
FIGS. 7 through 9 show flowcharts illustrating methods that support histogram computation for adaptive backlight algorithm in accordance with aspects of the present disclosure.

FIG. 7 shows a flowchart illustrating a method 700 that supports histogram computation for adaptive backlight algorithm in accordance with aspects of the present disclosure. The operations of method 700 may be implemented by a device or its components as described herein. For example, the operations of method 700 may be performed by an image processor as described with reference to FIGS. 5 through 6. In some examples, a device may execute a set of instructions to control the functional elements of the device to perform the functions described below. Additionally, or alternatively, a device may perform aspects of the functions described below using special-purpose hardware.

At 705, the device may capture, at a sensor of the device, an image frame including frame composition data. The operations of 705 may be performed according to the methods described herein. In some examples, aspects of the operations of 705 may be performed by an image capture manager as described with reference to FIGS. 5 through 6.

At 710, the device may generate histogram metadata for the image frame. The operations of 710 may be performed according to the methods described herein. In some examples, aspects of the operations of 710 may be performed by a histogram metadata generator as described with reference to FIGS. 5 through 6.

At 715, the device may encode the histogram metadata as SEI for the image frame. The operations of 715 may be performed according to the methods described herein. In some examples, aspects of the operations of 715 may be performed by a histogram metadata manager as described with reference to FIGS. 5 through 6.

At 720, the device may receive, at a display post-processing module of the device, the image frame and the histogram metadata. The operations of 720 may be performed according to the methods described herein. In some examples, aspects of the operations of 720 may be performed by a histogram metadata generator as described with reference to FIGS. 5 through 6.

At 725, the device may compute, by the display post-processing module of the device, a target display setting for the image frame based on the histogram metadata. The operations of 725 may be performed according to the methods described herein. In some examples, aspects of the operations of 725 may be performed by a display setting manager as described with reference to FIGS. 5 through 6.

At 730, the device may output the image frame to a display based on the computed display setting. The operations of 730 may be performed according to the methods described herein. In some examples, aspects of the operations of 730 may be performed by an image frame manager as described with reference to FIGS. 5 through 6.

Figure 8:
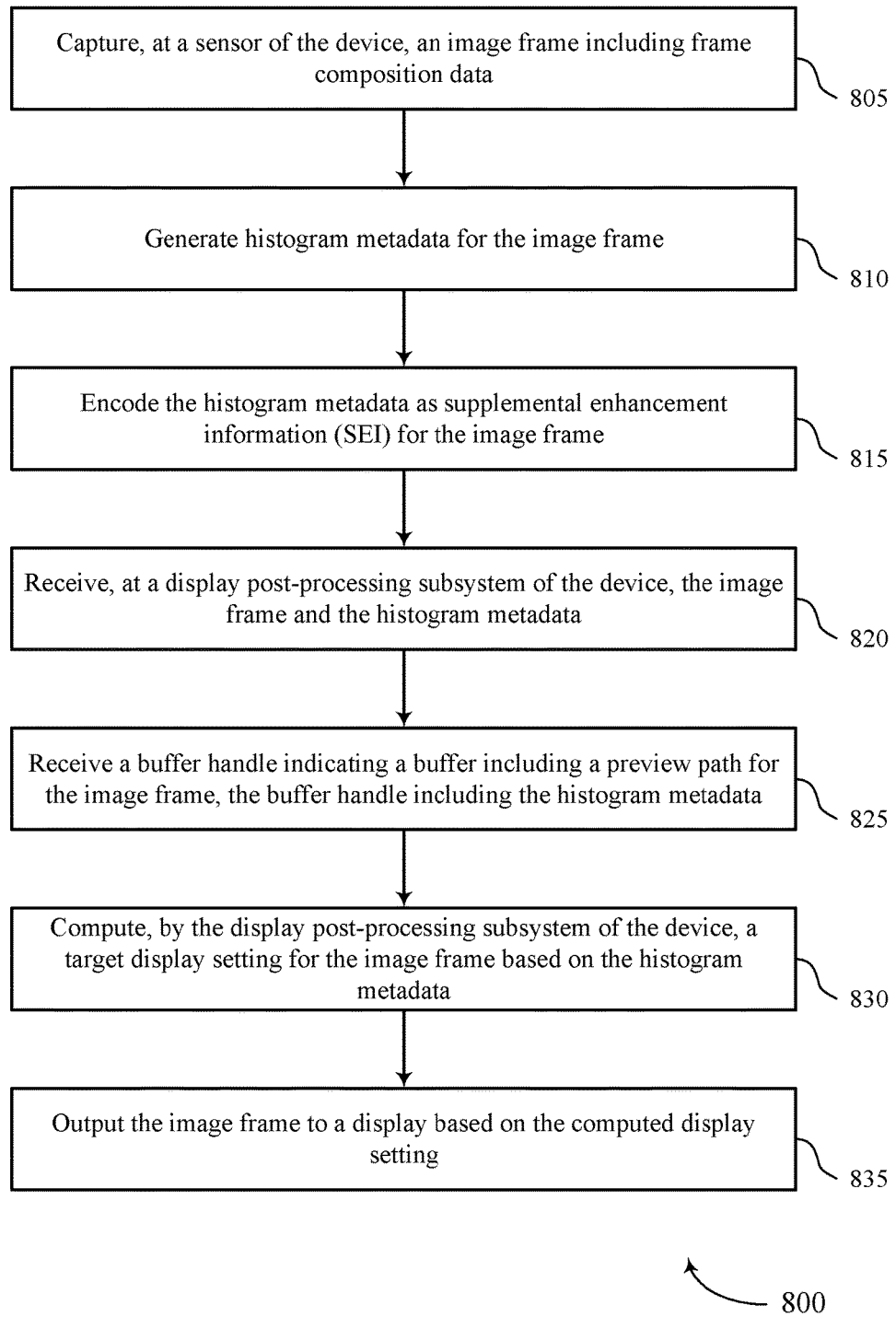

FIG. 8 shows a flowchart illustrating a method 800 that supports histogram computation for adaptive backlight algorithm in accordance with aspects of the present disclosure. The operations of method 800 may be implemented by a device or its components as described herein. For example, the operations of method 800 may be performed by an image processor as described with reference to FIGS. 5 through 6. In some examples, a device may execute a set of instructions to control the functional elements of the device to perform the functions described below. Additionally, or alternatively, a device may perform aspects of the functions described below using special-purpose hardware.

At 805, the device may capture, at a sensor of the device, an image frame including frame composition data. The operations of 805 may be performed according to the methods described herein. In some examples, aspects of the operations of 805 may be performed by an image capture manager as described with reference to FIGS. 5 through 6.

At 810, the device may generate histogram metadata for the image frame. The operations of 810 may be performed according to the methods described herein. In some examples, aspects of the operations of 810 may be performed by a histogram metadata generator as described with reference to FIGS. 5 through 6.

At 815, the device may encode the histogram metadata as SEI for the image frame. The operations of 815 may be performed according to the methods described herein. In some examples, aspects of the operations of 815 may be performed by a histogram metadata manager as described with reference to FIGS. 5 through 6.

At 820, the device may receive, at a display post-processing module of the device, the image frame and the histogram metadata. The operations of 820 may be performed according to the methods described herein. In some examples, aspects of the operations of 820 may be performed by a histogram metadata generator as described with reference to FIGS. 5 through 6.

At 825, the device may receive a buffer handle indicating a buffer including a preview path for the image frame, the buffer handle including the histogram metadata. The operations of 825 may be performed according to the methods described herein. In some examples, aspects of the operations of 825 may be performed by a buffer manager as described with reference to FIGS. 5 through 6.

At 830, the device may compute, by the display post-processing module of the device, a target display setting for the image frame based on the histogram metadata. The operations of 830 may be performed according to the methods described herein. In some examples, aspects of the operations of 830 may be performed by a display setting manager as described with reference to FIGS. 5 through 6.

At 835, the device may output the image frame to a display based on the computed display setting. The operations of 835 may be performed according to the methods described herein. In some examples, aspects of the operations of 835 may be performed by an image frame manager as described with reference to FIGS. 5 through 6.

Figure 9:
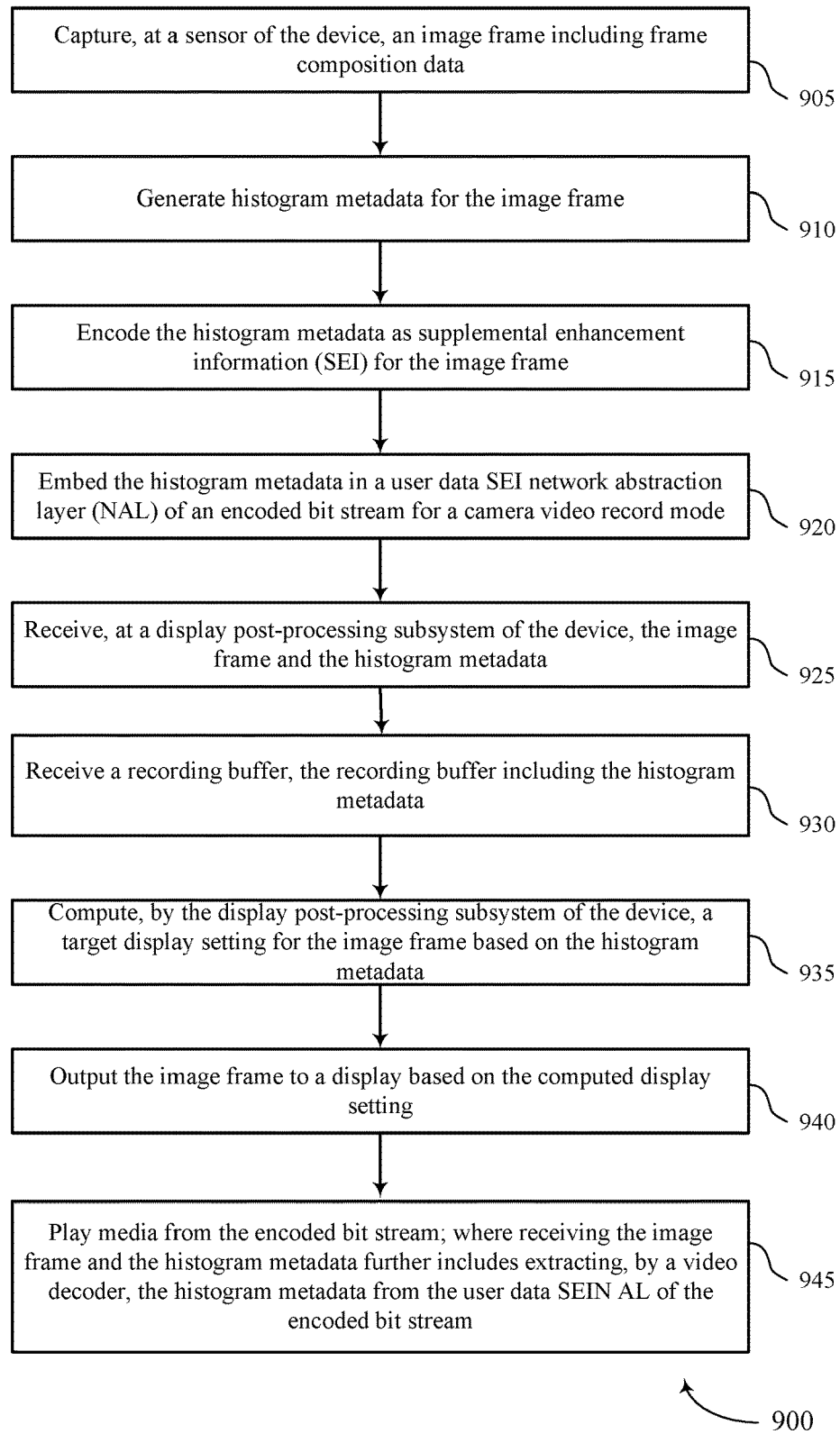

FIG. 9 shows a flowchart illustrating a method 900 that supports histogram computation for adaptive backlight algorithm in accordance with aspects of the present disclosure. The operations of method 900 may be implemented by a device or its components as described herein. For example, the operations of method 900 may be performed by an image processor as described with reference to FIGS. 5 through 6. In some examples, a device may execute a set of instructions to control the functional elements of the device to perform the functions described below. Additionally, or alternatively, a device may perform aspects of the functions described below using special-purpose hardware.

At 905, the device may capture, at a sensor of the device, an image frame including frame composition data. The operations of 905 may be performed according to the methods described herein. In some examples, aspects of the operations of 905 may be performed by an image capture manager as described with reference to FIGS. 5 through 6.

At 910, the device may generate histogram metadata for the image frame. The operations of 910 may be performed according to the methods described herein. In some examples, aspects of the operations of 910 may be performed by a histogram metadata generator as described with reference to FIGS. 5 through 6.

At 915, the device may encode the histogram metadata as SEI for the image frame. The operations of 915 may be performed according to the methods described herein. In some examples, aspects of the operations of 915 may be performed by a histogram metadata manager as described with reference to FIGS. 5 through 6.

At 920, the device may embed the histogram metadata in a user data SEI NAL of an encoded bit stream for a camera video record mode. The operations of 920 may be performed according to the methods described herein. In some examples, aspects of the operations of 920 may be performed by a histogram metadata embedding manager as described with reference to FIGS. 5 through 6.

At 925, the device may receive, at a display post-processing module of the device, the image frame and the histogram metadata. The operations of 925 may be performed according to the methods described herein. In some examples, aspects of the operations of 925 may be performed by a histogram metadata generator as described with reference to FIGS. 5 through 6.

At 930, the device may receive a recording buffer, the camera preview video buffer or the recording buffer including the histogram metadata. The operations of 930 may be performed according to the methods described herein. In some examples, aspects of the operations of 930 may be performed by a buffer manager as described with reference to FIGS. 5 through 6.

At 935, the device may compute, by the display post-processing module of the device, a target display setting for the image frame based on the histogram metadata. The operations of 935 may be performed according to the methods described herein. In some examples, aspects of the operations of 935 may be performed by a display setting manager as described with reference to FIGS. 5 through 6.

At 940, the device may output the image frame to a display based on the computed display setting. The operations of 940 may be performed according to the methods described herein. In some examples, aspects of the operations of 940 may be performed by an image frame manager as described with reference to FIGS. 5 through 6.

At 945, the device may play media from the encoded bit stream; where receiving the image frame and the histogram metadata further includes extracting, by a video decoder, the histogram metadata from the user data SEI NAL of the encoded bit stream. The operations of 945 may be performed according to the methods described herein. In some examples, aspects of the operations of 945 may be performed by a histogram metadata extractor as described with reference to FIGS. 5 through 6.

It should be noted that the methods described above describe possible implementations, and that the operations and the steps may be rearranged or otherwise modified and that other implementations are possible. Further, aspects from two or more of the methods may be combined.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for image processing at a device, comprising:
    capturing, at a sensor of the device, an image frame including frame composition data;
    generating histogram metadata for the image frame;
    encoding the histogram metadata as supplemental enhancement information (SEI) for the image frame;
    receiving, at a display post-processing module of the device, the image frame and the histogram metadata;
    computing, by the display post-processing module of the device, a target display setting for the image frame based at least in part on the histogram metadata; and
    outputting the image frame to a display based at least in part on the computed display setting.

2. The method of claim 1, wherein receiving the image frame and the histogram metadata further comprises:
    receiving a buffer handle indicating a buffer including a preview path for the image frame, the buffer handle including the histogram metadata.

3. The method of claim 1, wherein receiving the image frame and the histogram metadata further comprises:
    receiving a camera preview video buffer or a recording buffer, the camera preview video buffer or the recording buffer including the histogram metadata.

4. The method of claim 1, wherein encoding the histogram metadata as SEI further comprises:
    embedding the histogram metadata in a user data SEI network abstraction layer (NAL) of an encoded bit stream for a camera video record mode.

5. The method of claim 4, further comprising:
    playing media from the encoded bit stream; wherein receiving the image frame and the histogram metadata further comprises extracting, by a video decoder, the histogram metadata from the user data SEI NAL of the encoded bit stream.

6. The method of claim 1, wherein the target display setting is one or more of: a backlight setting, a pixel tone mapping setting, or a brightness setting.

7. The method of claim 1, wherein the image frame is one of a set of consecutive frames in a camera preview during a camcorder recording.

8. The method of claim 1, wherein the image frame is one of a set of consecutive frames in a video playback of a recorded clip.

9. An apparatus for image processing at a device, comprising:
    a processor,
    memory in electronic communication with the processor; and
    instructions stored in the memory and executable by the processor to cause the apparatus to:
        capture, at a sensor of the device, an image frame including frame composition data;
        generate histogram metadata for the image frame;

encode the histogram metadata as supplemental enhancement information (SEI) for the image frame;

receive, at a display post-processing module of the device, the image frame and the histogram metadata;

compute, by the display post-processing module of the device, a target display setting for the image frame based at least in part on the histogram metadata; and output the image frame to a display based at least in part on the computed display setting.

10. The apparatus of claim 9, wherein the instructions to receive the image frame and the histogram metadata further are executable by the processor to cause the apparatus to:

receive a buffer handle indicating a buffer including a preview path for the image frame, the buffer handle including the histogram metadata.

11. The apparatus of claim 9, wherein the instructions to receive the image frame and the histogram metadata further are executable by the processor to cause the apparatus to:

receive a camera preview video buffer or a recording buffer, the camera preview video buffer or the recording buffer including the histogram metadata.

12. The apparatus of claim 9, wherein the instructions to encode the histogram metadata as SEI further are executable by the processor to cause the apparatus to:

embed the histogram metadata in a user data SEI network abstraction layer (NAL) of an encoded bit stream for a camera video record mode.

13. The apparatus of claim 12, wherein the instructions are further executable by the processor to cause the apparatus to:

play media from the encoded bit stream; wherein receiving the image frame and the histogram metadata further comprises extracting, by a video decoder, the histogram metadata from the user data SEI NAL of the encoded bit stream.

14. The apparatus of claim 9, wherein the target display setting is one or more of a backlight setting, a pixel tone mapping setting, or a brightness setting.

15. The apparatus of claim 9, wherein the image frame is one of a set of consecutive frames in a camera preview during a camcorder recording.

16. The apparatus of claim 9, wherein the image frame is one of a set of consecutive frames in a video playback of a recorded clip.

17. A non-transitory computer-readable medium storing code for image processing at a device, the code comprising instructions executable by a processor to:

capture, at a sensor of the device, an image frame including frame composition data;

generate histogram metadata for the image frame;

encode the histogram metadata as supplemental enhancement information (SEI) for the image frame;

receive, at a display post-processing module of the device, the image frame and the histogram metadata;

compute, by the display post-processing module of the device, a target display setting for the image frame based at least in part on the histogram metadata; and output the image frame to a display based at least in part on the computed display setting.

18. The non-transitory computer-readable medium of claim 17, wherein the instructions to receive the image frame and the histogram metadata further are executable to:

receive a buffer handle indicating a buffer including a preview path for the image frame, the buffer handle including the histogram metadata.

19. The non-transitory computer-readable medium of claim 17, wherein the instructions to receive the image frame and the histogram metadata further are executable to:

receive a camera preview video buffer or a recording buffer, the camera preview video buffer or the recording buffer including the histogram metadata.

20. The non-transitory computer-readable medium of claim 17, wherein the instructions to encode the histogram metadata as SEI further are executable to:

embed the histogram metadata in a user data SEI network abstraction layer (NAL) of an encoded bit stream for a camera video record mode.

* * * * *